United States Patent [19]

Ema

[11] Patent Number: 4,975,849
[45] Date of Patent: Dec. 4, 1990

[54] SUSPENSION CONTROLLER FOR VEHICLE

[75] Inventor: Sumio Ema, Kanagawa, Japan

[73] Assignee: Tokico Ltd., Kanagawa, Japan

[21] Appl. No.: 331,044

[22] Filed: Mar. 27, 1989

Related U.S. Application Data

[63] Continuation of Ser. No. 61,543, Jun. 12, 1987, abandoned.

[30] Foreign Application Priority Data

Jun. 20, 1986 [JP] Japan .................. 144163/1986

[51] Int. Cl.[5] .......................................... B60G 17/00
[52] U.S. Cl. ................... 364/424.05; 280/707; 280/840
[58] Field of Search ............... 364/424.05; 280/707, 280/708, 6 R, 6 G, 840

[56] References Cited

U.S. PATENT DOCUMENTS

| | | | |
|---|---|---|---|
| 4,573,705 | 3/1986 | Kanai et al. | 280/707 |
| 4,575,116 | 3/1986 | Miyata | 280/707 |
| 4,589,676 | 5/1986 | Meloche et al. | 280/714 X |
| 4,624,476 | 11/1986 | Tanaka et al. | 280/707 |
| 4,624,477 | 11/1986 | Kamagai et al. | 280/707 |
| 4,625,993 | 12/1986 | Williams et al. | 280/707 |
| 4,625,994 | 12/1986 | Tanaka et al. | 280/708 X |
| 4,634,143 | 1/1987 | Arami et al. | 280/707 |
| 4,650,212 | 3/1987 | Yoshimura | 280/707 |
| 4,673,194 | 6/1987 | Sugasawa | 364/424 X |
| 4,693,493 | 9/1987 | Ikemoto et al. | 280/707 |
| 4,730,843 | 3/1988 | Tanaka et al. | 280/707 |

*Primary Examiner*—Gary Chin
*Attorney, Agent, or Firm*—Wenderoth, Lind & Ponack

[57] ABSTRACT

A suspension controller for a vehicle which includes a plurality of suspension units containing a hydraulic fluid and which is designed to bear a part or the whole of the load of the vehicle body by utilizing the pressure of the hydraulic fluid and to expand or contract the suspension units by adjusting the amount of hydraulic fluid contained in the suspension units, thereby adjusting the attitude of the vehicle body. An anticipated change in the attitude of the vehicle is estimated from present running conditions of the vehicle, and control of each of the suspension units is started immediately thereafter so as to suppress the change in attitude or change the attitude of the vehicle as desired. Accordingly, it is possible to effectively control the attitude of the vehicle during cornering or at the time of moving the vehicle forward rapidly from start or when the brakes are applied suddenly. Thus, the driving performance is improved by a large margin, and the occupant of the vehicle can be assured of enjoying a comfortable ride.

7 Claims, 9 Drawing Sheets

SUSPENSION CONTROLLER FOR VEHICLE

This application is a continuation, of now abandoned application Ser. No. 07/061,543 filed June 12, 1987 now abandoned.

BACKGROUND OF THE INVENTION

1. Field of the Invention

The present invention relates to a suspension controller for use in a vehicle, such as, an automobile. More particularly, the present invention pertains to a suspension controller for a vehicle which enables the attitude of the vehicle to be maintained in an appropriate state even when there are changes in accelerating or braking forces acting on the vehicle or changes in centrifugal forces that act on the vehicle while cornering.

2. Description of the Related Art

When a vehicle which is at rest is moved forward by application of the accelerator, inertia acts on the vehicle in a backward direction, so that the load acting on the suspension units for the rear wheels increases while the load acting on the suspension units for the front wheels decreases. As a result, the suspension units for the rear wheels are contracted, while the suspension units for the front wheels are expanded, thus causing the front portion of the vehicle to rise. This is known as the "squat phenomenon". When the accelerator is released to a certain degree after the vehicle speed has reached a desired level, a reactive jerk occurs. When braking force is applied to a moving vehicle, inertia acts on the vehicle in the forward direction, so that the load acting on the suspension units for the front wheels increases, while the load acting on the suspension units for the rear wheels decreases. As a result, the suspension units for the front wheels are contracted, while the suspension units for the rear wheels are expanded, thus causing the front part of the vehicle to dive, which is known as the "nose dive phenomenon". Additionally, when the vehicle comes to a stop, a reactive jerk occurs. These unfavorable movements of the vehicle, i.e., the squat and nose dive phenomena and the reactive jerks described, appear suddenly and strongly in proportion to the degree of acceleration or deceleration that is caused to act on the vehicle at a given moment and also in proportion to the degree of change in acceleration or deceleration from the level that had been acting on the vehicle at that given moment.

Generally speaking, when a vehicle is driven around a corner, centrifugal force resulting from the rotation of the vehicle acts outwardly from the center of rotation on the vehicle. As a result, the load acting on the outer suspension units which are disposed on the outer side of the turning circle of the vehicle increases, while the load acting on the inner side suspension units decreases. Accordingly, the outer side suspension units are contracted and the inner side suspension units are expanded, thus causing the vehicle to tilt and roll. In such circumstances, the vehicle body is subjected to a resultant force from centrifugal and gravitational forces, and since the vehicle is tilting, the occupant of the vehicle is subjected to composite acceleration .that acts in a direction which is considerably offset from the direction perpendicular to the floor surface of the vehicle body, thus making the occupant feel uncomfortable.

The following attempts have been made to cope with the above-described problems which have in the past been experienced. According to one of the solutions, a height sensor is employed to detect the degree of inclination of the vehicle body. Detection results are fed back to a controller which serves to control each suspension unit so that the vehicle body is returned to the normal horizontal state. In this type of control, however, when the acceleration acting on the vehicle suddenly changes and the vehicle body is suddenly tilted a substantial degree, the control cannot promptly respond to the change in attitude of the vehicle body, so that the tilting of the vehicle body cannot be effectively controlled.

As a method of controlling a vehicle during cornering, the following procedure has been attempted. In order to keep the floor surface of the vehicle perpendicular to the direction in which composite acceleration is acting on the vehicle body at any given moment, the degree of acceleration acting on the vehicle body is detected by means of an accelerometer, and the direction of the composite acceleration is calculated. Then each suspension unit is controlled so that the floor surface of the vehicle is perpendicular to the calculated direction. In this arrangement, any change in the attitude of the vehicle body which is actually occurring is detected and the detected change in attitude is fed back to a controller in order to control each suspension unit. The control of each suspension unit is practically effected by supplying or discharging the working oil to or from the unit so as to adjust the expansion or contraction position of the suspension unit. A certain period of time is therefore required for each suspension unit to be brought into a desired expansion/contraction position. Accordingly, this time delay disadvantageously hinders the control from satisfactorily responding to any kaleidoscopic change in posture of the vehicle body.

SUMMARY OF THE INVENTION

In view of these circumstances, it is a primary object of the present invention to provide a suspension controller for a vehicle which is free from the above-described disadvantages of the prior art.

To this end, the present invention provides a suspension controller for a vehicle which includes a plurality of suspension units containing a hydraulic fluid and which is designed to support a part or the whole of the load of the vehicle body by utilizing the pressure of the hydraulic fluid and to expand or contract the suspension units by adjusting the amount of hydraulic fluid contained in the suspension units, thereby adjusting the attitude of the vehicle body, wherein the improvement comprises: first detecting means for detecting various kinds of vehicle operating conditions which may cause a change in the attitude of the vehicle body, such as the vehicle speed and the operating conditions of the steering wheel, brake and accelerator; calculating means adapted to receive the output of the first detecting means and perform predetermined calculation to obtain desired data; second detecting means for detecting the expansion/contraction positions of the suspension units; memory means for storing as storage data combinations of various values of the same kind of data as the data calculated by the calculating means and also storing control data items used to control the suspension units, said control data items being predetermined in correspondence with the storage data, respectively; control means adapted to hold one of the control data items used to control the suspension units and control the expansion/ contraction positions of the suspension units on the basis of the held control data item and a signal output from the second detecting means so that the expansion/contraction positions of the suspension units are coincident with the held control data item; and rewriting means adapted to check data calculated by the calculating means with the storage data, select one control data item that corresponds to the calculated data, and rewrite and replace the control data item which has been held by the control means with the selected control data item, the control of the suspension units being started by the control means immediately after rewriting of the control data item has been completed.

The above and other objects, features and advantages of the present invention will become more apparent from the following description of the preferred embodiments thereof, taken in conjunction with the accompanying drawings.

BRIEF DESCRIPTION OF THE DRAWINGS

FIG. g is a graph showing the output characteristics of the speed sensor shown in FIG. 1.

DETAILED DESCRIPTION OF THE PREFERRED EMBODIMENTS

A first embodiment of the present invention will be described hereinunder with reference to the accompanying drawings. According to this embodiment, each of the suspension units of the vehicle is controlled so that the floor surface of the vehicle is maintained to extend in a direction perpendicular or approximately perpendicular to the direction in which composite acceleration is acting on the vehicle during cornering.

Figure 1:
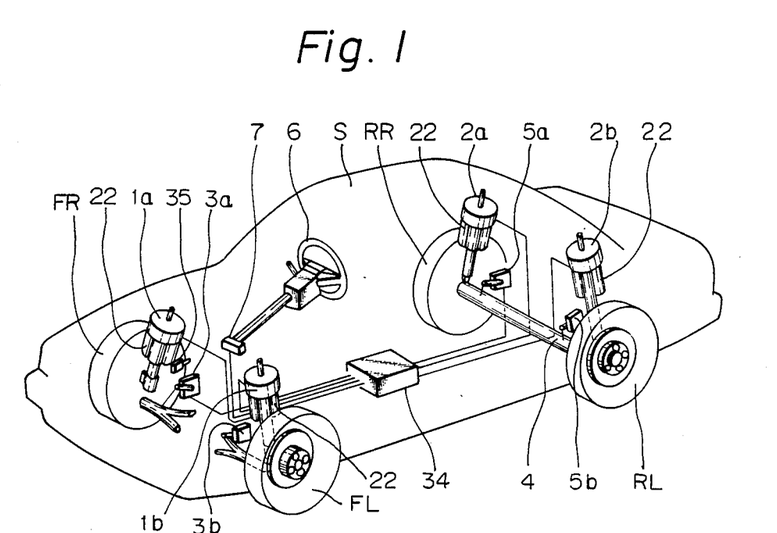
FIG. 1 is a schematic perspective view of a first embodiment of the present invention, which shows the arrangement of each of the constituent elements of the suspension controller.

FIG. 1 shows the arrangement of suspension units and various sensors. More specifically, the suspension units 1a, 1b and 2a, 2b are mounted on the axles of front wheels FR, FL and rear wheel RR, RL, respectively, in such a manner as to support the body S of a vehicle. The heights of the right and left front portions of the vehicle body S are measured by means of height sensors 3a and 3b, respectively while the heights of the right and left rear portions of the vehicle body S are measured by means of height sensors 5a and 5b, respectively. The angle of rotation of a steering wheel 6 is detected by means of a steering sensor 7. It should be noted that each of the height sensors in this embodiment is arranged such that the range of variable height of the corresponding portion of the vehicle body S is divided into seven regions. Each height sensor outputs one of the seven height detecting signals in the form of logic signals which represent the seven levels corresponding to the seven height regions, i.e., from the neutral position (N) to the highest position (HH) and to the lowest position (LL). The speed sensor 35 is arranged to detect the speed of the vehicle and output a signal corresponding to the detected vehicle speed.

The arrangement of the suspension controller according to this embodiment will next be explained with reference to FIG. 3. Since the suspension units 1a, 1b, 2a and 2b have the same arrangement, the suspension unit 1a alone is illustrated in detail and illustration of the other units is omitted.

Figure 3:
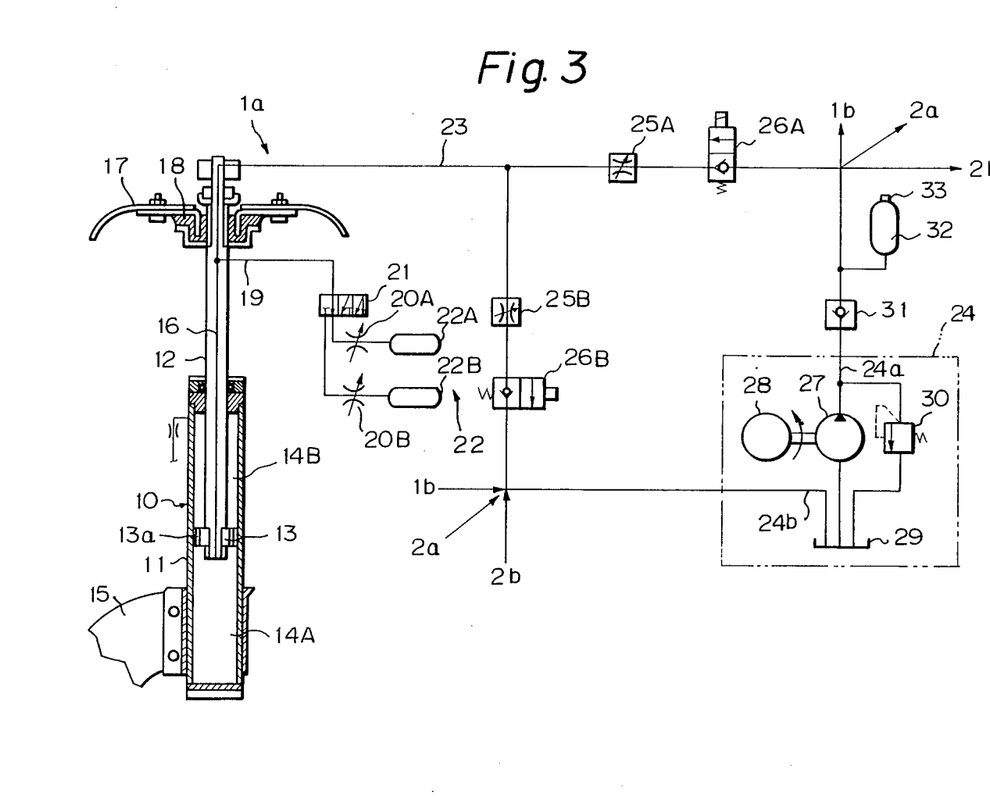
FIG. 3 is a diagram showing the hydraulic system of one of the suspension units shown in FIG. 1.

Referring to FIG. 3, the reference numeral 10 denotes a suspension body which comprises a shell 11 formed with a cylindrical structure, a rod 12 received inside the shell 11 in such a manner that the rod 12 is movable relative to the shell 11, and a piston 13 secured to the distal end of the rod 12. The interior of the shell 11 is partitioned into oil chambers 14A and 14B by the piston 13, the chambers 14A and 14B communicating with each other through communicating passages 13A provided in the piston 13. A hydraulic oil flow path 16 is formed in the central portion of the rod 12 in such a manner that the flow path 16 extends in the axial direction of the rod 12. The arrangement is such that the piston 13 is moved vertically as viewed in FIG. 3 by supplying or discharging hydraulic oil to or from the oil chamber 14A, thereby adjusting the expansion/contraction position of the suspension unit 1a and thus adjusting the height of the right front portion of the vehicle body S. The case is the same case with the other suspension units. The lower end portion of the shell 11 is connected to the axle through a knuckle 15, while the upper end portion of the rod 12 is rigidly secured to a mounting frame 17 which is provided on the vehicle body, through a mount rubber 18 provided on the frame 17.

A branch 19 is connected to the oil flow path 16. The branch 19 is provided with a selector valve 21, and a plurality of accumulators 22A and 22B are connected to the branch 19 through damper valves 20A and 20B, respectively, so that the accumulators 22A and 22B are selectively connected to the hydraulic system.

The flow path 16 is connected to a delivery-side port 24a and a return-side port 24b of a hydraulic unit 24 through piping 23. The flow path which extends to the port 24a is provided with a flow rate control valve 25A and a selector valve 26A. The flow path which extends to the port 24b is provided with a flow rate control valve 25B and a selector valve 26B. The hydraulic unit 24 comprises a pump 27, a motor 28, a reservoir tank 29 and a relief valve 30.

Further, a check valve 31 is provided between the delivery-side port 24a and the selector valve 26A. A branch is connected to the flow path between the check valve 31 and the selector valve 26A and this branch is provided with an accumulator 32. The accumulator 32 which is similar to the above-described accumulators 22A and 22B is of the gas-filled type, and a pressure sensor 33 is activated in response to a It should be noted that the hydraulic pipings 23 which respectively extend to the suspension units 1a, 1b, 2a and 2b have the same arrangement and are connected to the hydraulic unit 24 in parallel with each other.

In each of the suspension units 1a, 1b, 2a and 2b having the above-described arrangement, hydraulic oil is supplied to the suspension unit by actuating the supply-side selector valve 26A so that the suspension body 10 is connected to the delivery-side port 24a of the hydraulic unit 24. In consequence, the suspension unit concerned is expanded, and the position of the corresponding portion of the vehicle body S is thereby raised. The hydraulic oil is discharged by actuating the selector valve 26B so that the suspension body 10 is connected to the return-side port 24b of the hydraulic unit 24. As a result, the suspension unit concerned is contracted under the weight of the vehicle, and the corresponding portion of the vehicle body S is thereby, lowered. Further, the number of accumulators 22A and 22B connected to the suspension body 10 can be varied by actuating the selector valve 21 so as to adjust the spring constant and damping force of each of the suspension units 1a, 1b, 2a and 2b.

The arrangement of the controller for the above-described suspension system will next be explained with reference to FIG. 4.

Figure 4:
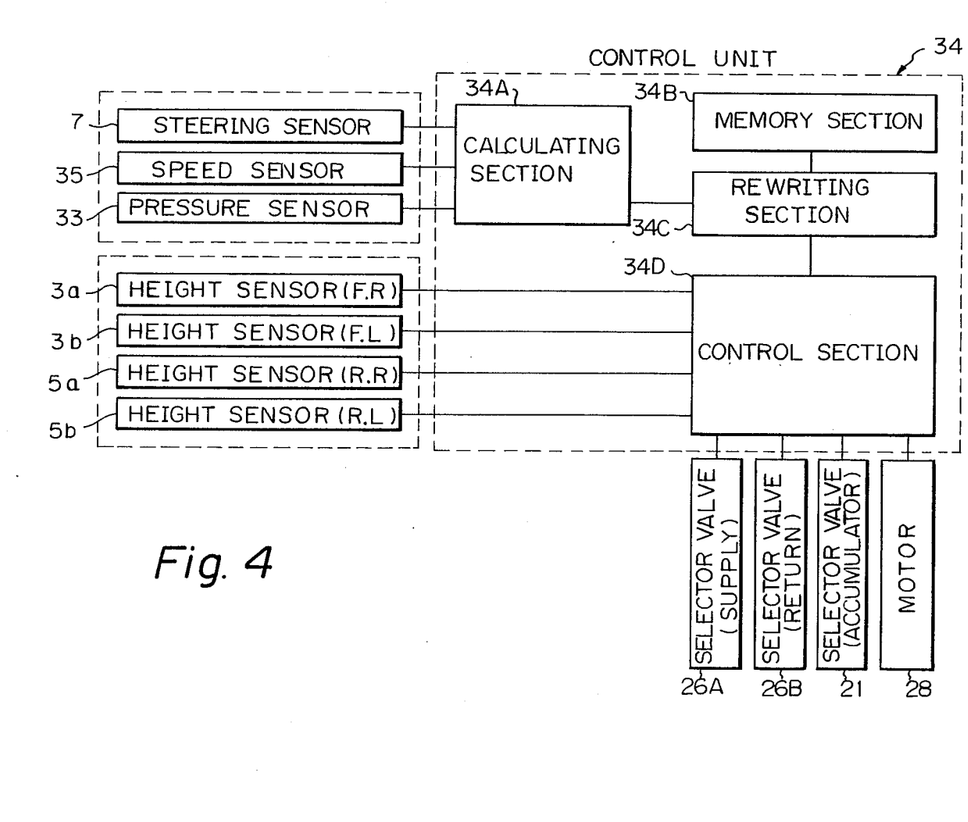
FIG. 4 is a block diagram of the control system of the suspension controller shown in FIG. 1.

As shown in FIG. 4, the control of the suspension system is effected by a control unit 34 defined by a microcomputer or the like which has a calculating section 34A, a memory section 34B, a rewriting section 34C and a control section 34D. The control unit 34 is supplied with inputs comprising detection signals from the height sensors 3a, 3b, 5a and 5b, a detection signal from the steering sensor 7, a detection signal from the pressure sensor 33, and a detection signal from the speed sensor 35. Additionally, the control unit 34 is connected to the supply-side selector valve 26A, the return-side selector valve 26B, the selector valve 21 for adjusting the damping force for each of the suspension units 1a, 1b, 2a and 2b, together with the motor 28 in the hydraulic unit 24, whereby these suspension units 1a, 1b, 2a and 2b are controlled.

The memory section 34B in the control unit 34 is so arranged as to store various combinations of three data items concerning the operation of the steering wheel which is obtained from the steering wheel 7, i.e., the direction, angle and speed of rotation of the steering wheel, and one data item obtained from the speed sensor 35, i.e., the vehicle speed. The memory section 34B further stores the optimal expansion/contraction position of each suspension unit (the amount of oil which is to be supplied to each suspension unit), which is calculated as described below, corresponding to each of the above-described combinations of data. More specifically, the value of the amount of oil which corresponds to the expansion/contraction position of each suspension unit wherein the floor surface of the vehicle body can be maintained to extend in a direction which is perpendicular, or approximately perpendicular, to the direction of the forces resulting from centrifugal force and gravitational force is stored in correspondence with each of the combinations of data in the form of a table.

Figure 2:
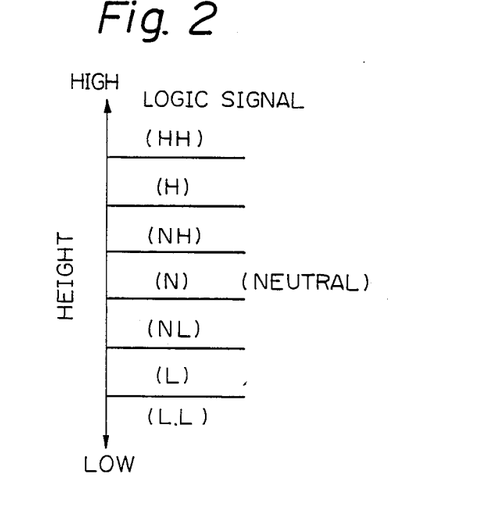
FIG. 2 shows the relationship between the height of the vehicle body and signals output from each of the height sensors shown in FIG. 1.

As a set of data, a set of values for the direction (+ or −), angle ($\theta$) and angular velocity ($\theta°$) of rotation of the steering wheel are set. It is assumed that the running condition of the vehicle is under said set of values at a given moment, and the running speed of the vehicle and radius of rotation after, for example, 0.5 seconds, are estimated in order to calculate the degree of acceleration $\alpha$ which is expected to act on the vehicle body after 0.5 seconds. The amount of oil which corresponds to an appropriate expansion/contraction position of each suspension unit for maintaining the floor surface of the vehicle to extend in a direction perpendicular or approximately perpendicular to the direction of composite acceleration of the calculated acceleration $\alpha$ and acceleration of gravity is calculated for each of the seven regions shown in FIG. 2, and a set of logics which represent each of the seven regions is stored in correspondence with the above-described set of data. Similarly, another set of logics is set in correspondence with another set of data consisting of a combination of values different from the above-described combinations. In this way, a large number of sets of data and sets of logics are arranged so as to correspond to each other and stored in the memory section 34B in the form of a table.

Figure 8:
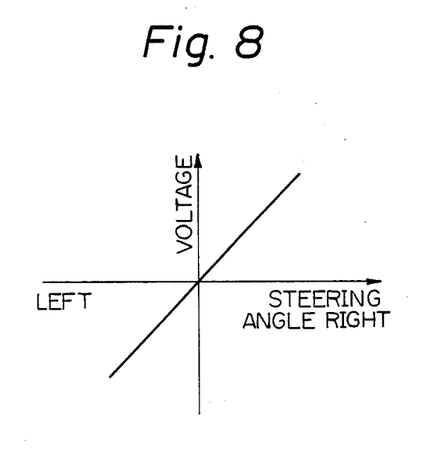
FIG. 8 is a graph showing the output characteristics of the steering sensor shown in FIG. 1.

The steering sensor 7 is arranged to output a detection signal which is proportional to the degree of angle of rotation of the steering wheel in such a manner that, when the steering wheel is turned clockwise from a neutral point, the sign "+" is added to the detection signal, whereas, when the steering wheel is turned counterclockwise, the sign "−" is added to the detection signal, as shown in FIG. 8. The control unit 34 calculates the direction of rotation of the steering wheel, the speed of rotation thereof (the change in the rotational angle per unit of time) and the angle of rotation of the steering wheel from the neutral point on the basis of this detection signal. The speed sensor 35 converts each detected vehicle speed into a corresponding voltage and outputs this voltage as a detection signal, as shown in FIG. g. It should be noted that changes in the above-described parameters may be represented by changes in the number of pulses which are generated in accordance with the operation and operating speed of the steering wheel.

The following is a description of the operation of the suspension controller in accordance with this embodiment. The inclination of the vehicle body which occurs when the vehicle corners without any control of the suspension will first be explained.

Figure 5:
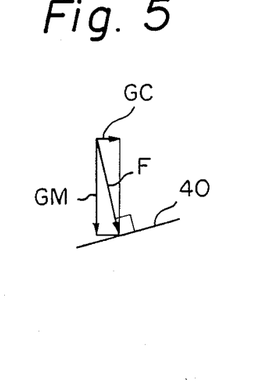
FIG. 5 shows how acceleration acts on the vehicle body.
Figure 6:
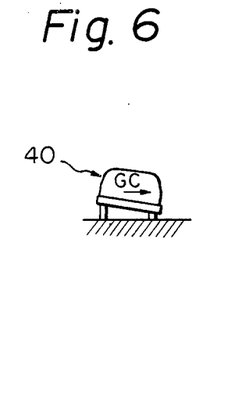
FIG. 6 shows a rolling state of the vehicle body in the case where no suspension control is carried out.

When the vehicle is running straight forward, a predetermined load is acting on each suspension unit. For example, if the vehicle 40 shown in FIG. 6 starts cornering along a circular arc which is drawn about a point that is located to the left of the vehicle 40, rightward centrifugal force GC acts on the vehicle as illustrated. As a result, a force F resulting from the centrifugal force GC and the gravity GM that act on the vehicle acts in an obliquely downward and rightward direction (see FIG. 5). Accordingly the load acting on each suspension unit for the right-hand wheels increases, while the load acting on each suspension unit for the left-hand wheels decreases, so that the right-hand suspension units are contracted, and the left-hand suspension units are expanded, and the vehicle is thus tilted rightward at a certain rolling angle. The centrifugal force GC or acceleration $\alpha$ which acts at that time is determined by the speed and radius of rotation of the vehicle at that moment.

The control of the suspension system effected by the controller in accordance with this embodiment will next be explained.

While the vehicle is moving straight forward, the control section 34D in the control unit 34 holds the control logic "N" for all the suspension units 1a, 1b, 2a and 2b. In addition, logic signals that indicate the heights of various portions of the vehicle body S which are detected by the respective height sensors 3a, 3b, 5a and 5b are fed back to the control section 34D in the control unit 34. The logic signals are compared with the control logics held in the control section 34D, and each of the suspension units 1a, 1b, 2a and 2b is controlled on the basis of the result of the comparison so that each of those portions of the vehicle body S maintains the height "N". In the meantime, the speed sensor 35 and the steering sensor 7 continuously detect the vehicle speed and the angle of rotation of the steering wheel (the angle is 0 because the vehicle is running straight forward), respectively.

Figure 9:
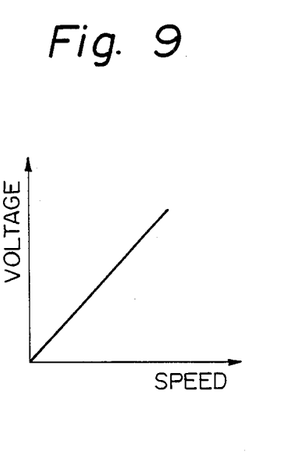

When the steering wheel 6 is rotated in order to turn the vehicle, the steering sensor 7 outputs a detection signal which is proportional to the angle of rotation of the steering wheel 6 in such a manner that, when the steering wheel 6 is turned clockwise from the neutral point, the sign "+" is added to the detection signal, whereas, when the steering wheel 6 is rotated counter-clockwise, the sign "−" is added to the detection signal, as shown in FIG. 8, the detection signal being input to the calculating section 34A in the control unit 34. The calculating section 34A calculates on the basis of the input detection signal the direction of rotation of the steering wheel 6, the speed of rotation thereof (a change in the rotation angle per unit of time) and the angle of rotation of the steering wheel 6 from the neutral point. The speed sensor 35 inputs a signal corresponding to the detected vehicle speed to the calculating section 34A in the control unit 34, as shown in FIG. 9. The rewriting section 34C in the control unit 34 checks the set of data thus obtained, that is, the vehicle speed and the direction, angle and speed of rotation of the steering wheel, with the table stored in the memory section 34B in the control unit 34 to find a set of logics stored in correspondence with the set of detected data. As described above, this set of logics corresponds to such an expansion/contraction position of each suspension unit that the floor surface of the vehicle can be kept perpendicular to the direction of action of the force resulting from acceleration or centrifugal force and gravity, said acceleration being the one which is anticipated to act on the vehicle after 0.5 seconds on the basis of the present running conditions of the vehicle. The control logics "N" which have been stored in the control section 34D in the control unit 34 is rewritten and replaced with a set of logics thus found, for example, "H" as a logic for each of the suspension units 1a and 2a disposed on the right-hand side of the vehicle and "L" as a logic for each of the suspension units 1b and 2b disposed on the left-hand side of the vehicle. The vehicle body has not yet been tilted at this point of time, so that the detection signals output from the height sensors 3a, 3b, 5a and 5b are all "N" and, therefore, the signals are different from the control logics which have just been rewritten. Accordingly, the control of each of the suspension units 1a, 1b, 2a and 2b is started so that the expansion/contraction position of each suspension unit is coincident with the corresponding control logic. More specifically, the supply-side selector valve 26A and the discharge-side selector valve 26B of each of the suspension units 1a and 2a are actuated so that the suspension body 10 is communicated with the delivery-side port 24a of the hydraulic unit 24 and the communication between the suspension body 10 and the return-side port 24b is cut off. Delivery of hydraulic oil into the suspension units 1a and 2a is then started so as to expand the suspension units 1a and 2a. On the other hand, when the selector valves 26A and 26B for each of the suspension units 1b, and 2b are actuated so that the suspension body 10 is communicated with the return-side port 24b of the hydraulic unit 24 and the communication between the suspension body 10 and the delivery-side port 24a is cut off, the return of hydraulic oil in each of the suspension units to the hydraulic unit 24 is started so as to cause the suspension units 1b and 2b to be contracted by the weight of the vehicle. In consequence after 0.5 seconds has elapsed, the suspension units 1a and 2a are expanded by an amount corresponding to the control logic "H", while the suspension units 1b and 2b are contracted by an amount corresponding to the control logic "L" In the meantime, signals which respectively indicate the actual heights of various portions of the vehicle body S are constantly fed back to the control unit 34 from the height sensors 3a, 3b, 5a and 5b so as to be compared with the control logics held in the control section 34D in order to control the supply and delivery of hydraulic oil, as described above.

After a predetermined period of time, for example, 0.05 seconds, has elapsed from the previous detection of data by means of the speed sensor 35 and the steering sensor 7, the vehicle speed and angle of rotation of the steering wheel 6 at that moment are detected again and input to the calculating section 34A in the control unit 34. Then, a set of logics which corresponds to a target rolling angle (in this embodiment the rolling angle at which the floor surface of the vehicle body is perpendicular to the direction in which the force F acts on the vehicle) with respect to the acceleration which is anticipated to act on the vehicle body after 0.5 seconds is found in accordance with a procedure similar to that described above. If the set of logics thus found is the same as the previous set of logics, the control logics held in the control section 34D are not rewritten, and the control already under way is continued. When it is confirmed on the basis of the outputs of the height sensors 3a, 3b, 5a and 5b that the respective expansion/contraction positions of the suspension units 1a, 1b, 2a and 2b are coincident with the control logics held in the control section 34D in the control unit 34, feedback control is effected thereafter so that each suspension unit is maintained in that state.

On the other hand, if the set of logics newly selected from the table is different from the control logics previously held in the control section 34D in the control unit 34, for example, if the set of logics newly selected include "HH" with respect to the suspension units 1a and 2a which are disposed on the right-hand side of the vehicle and "LL" with respect to the suspension units 1b and 2b disposed on the left-hand side of the vehicle, the control logics "H" and "L" held in the control section 34D are immediately rewritten and replaced with "HH" and "LL", respectively, and at the same time, the control of the expansion/contraction position of each of the suspension units 1a, 1b, 2a and 2b is started on the basis of the new control logics "HH" and "LL".

Signals from the speed sensor 35 and the steering sensor 7 are input to the control unit 34 every 0.05 seconds, and the above-described control is effected continuously.

Figure 7:
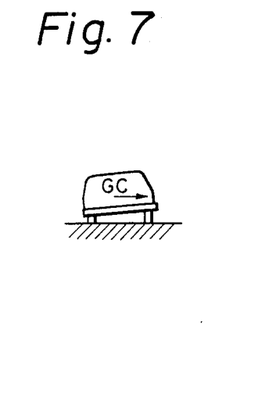
FIG. 7 shows a state of the vehicle body in the case where suspension control is effected by the controller shown in FIG. 1.

Thus, each of the data which changes kaleidoscopically during cornering is compared with storage data in the table and, while this is happening, an optimal expansion/contraction position is given to each of the suspension units 1a, 1b, 2a and 2b, thereby adjusting the tilting of the vehicle body as shown in FIG. 7, and thus enabling the floor surface of the vehicle to be kept perpendicular or approximately perpendicular to the direction of action of the force F resulting from centrifugal force GC and gravity GM during cornering.

In the meantime, various portions of the vehicle body S are detected by the respective height sensors 3a, 3b, 5a and 5b and the detection signals are input to the control unit 34 which, in turn, effects control so that the expansion/contraction positions of the suspension units 1a, 1b, 2a and 2b are respectively coincident with the control logics held in the control section 34D in the control unit 34. After coincidence has been obtained, the control unit 34 effects control so that the coincident states are maintained unless the control logics held in the control section 34D are rewritten.

When the internal pressure of the accumulator 32 becomes lower than a predetermined value, a signal representing this fact is output from the pressure sensor 33 to the control unit 34. In response to this input signal the control unit 34 starts the motor 38 in the hydraulic unit 24 so as to maintain the hydraulic pressure in the suspension control system at an optimal level.

Further, the spring constant of each of the suspension units 1a, 1b, 2a and 2b can be adjusted by actuating the selector valve 21 so as to appropriately vary the number of accumulators 22A and 22B to be connected to the hydraulic system. Therefore, when the control unit 34 judges from a speed of change of the actual expansion/contraction position of each of the suspension units 1a, 1b, 2a and 2b detected by the corresponding height sensor that the response speed for adjustment of the suspension unit is unsatisfactory, the control unit 34 actuates the selector valve 21 so that the damping characteristics and spring constant of each of the suspension units 1a, 1b, 2a and 2b is relatively "hard". More specifically, the communication between one of the accumulators 22A and 22B, e.g., the accumulator 22B, and the hydraulic system is cut off. Consequently, oil only flows into the accumulator 22A, and the response speed for adjustment of the suspension unit is increased. When the response speed is exceedingly high, it suffices to increase the number of accumulators to be connected to the hydraulic system.

The calculating section 34A in the control unit 34 in accordance with this embodiment may be arranged such as to calculate the acceleration which is expected to act on the vehicle after 0.5 seconds from data supplied thereto from the speed sensor 35 and the steering sensor 7. In such a case, the memory section 34B in the control unit 34 stores values for various degrees of acceleration and logics corresponding thereto in the form of a table.

A second embodiment of the present invention will next be explained with reference to FIGS. 10 to 14. In this embodiment, when the vehicle is subjected to force which causes a sudden change in the attitude of the vehicle, that is, acceleration or deceleration, each of the suspension units is controlled so that the vehicle body is maintained in a horizontal state against the force that tends to change the attitude of the vehicle body. More specifically, each suspension unit is controlled so that the vehicle body is maintained in a horizontal state even when accelerating or braking force suddenly acts on the vehicle or the acclerating or decelerating force acting on the vehicle changes suddenly in such a way that none of the mere feedback control methods which have heretofore been proposed can follow such a sudden application of or change in the accelerating or decelerating force, or even when the steering wheel is turned suddenly. It should be noted that elements or portions in this embodiment which are common to the first embodiment are denoted by the same reference numerals and description thereof is omitted.

Figure 10:
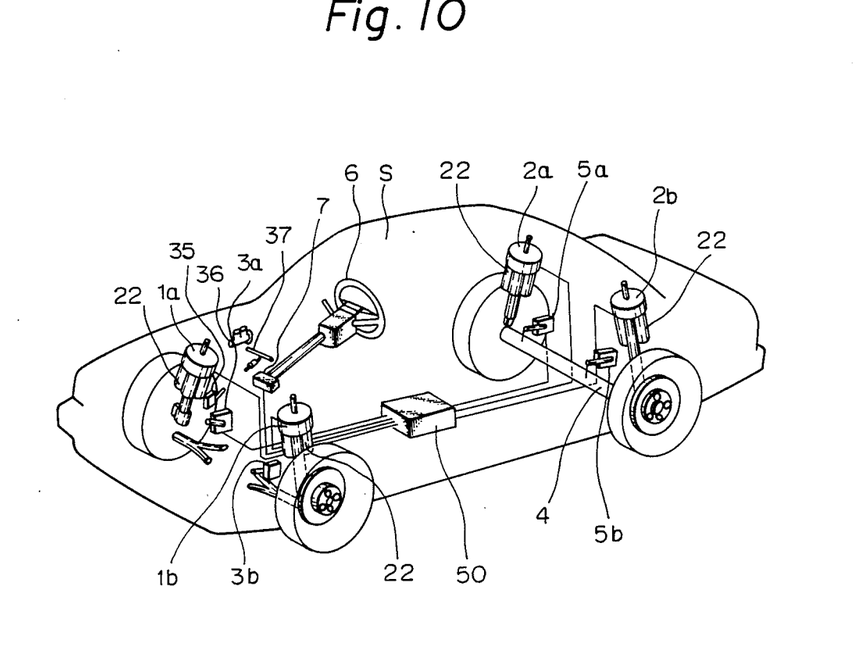
FIG. 10, which is similar to FIG. 1, shows a second embodiment of the present invention.

FIG. 10 shows the arrangement of suspension units and various sensors in accordance with this embodiment.

The suspension units 1a, 1b and 2a, 2b are mounted on axles for wheels FR, FL and RR, RL so as to support right and left front portions and right and left rear portions of the vehicle body S, respectively. The heights of these portions of the vehicle body S are measured by means of height sensors 3a, 3b, 5a and 5b, respectively. Each of these height sensors is arranged such that the range of variable height of the corresponding portion of the vehicle body S is divided into seven regions. The height sensor outputs one of the seven height detecting signals in the form of logic signals which represents seven levels corresponding to the seven height regions (see FIG. 2) in the same way as the height sensors in accordance with the first embodiment. This embodiment is provided with a throttle position sensor 36 for detecting the degree of application of the accelerator (not shown), that is, the position of the throttle valve of the engine at any given moment, and a brake sensor 37 for detecting the level of the braking force which is applied to the vehicle by means of a brake system (not shown), that is, the pressure level of the braking fluid at any given moment, in addition to the steering sensor 7 and the speed sensor 35 which are employed in the first embodiment.

Since the arrangements of the suspension units 1a, 1b, 2a and 2b and the hydraulic unit 24 which are employed in this embodiment are the same as those in the first embodiment, description thereof is omitted.

Figure 11:
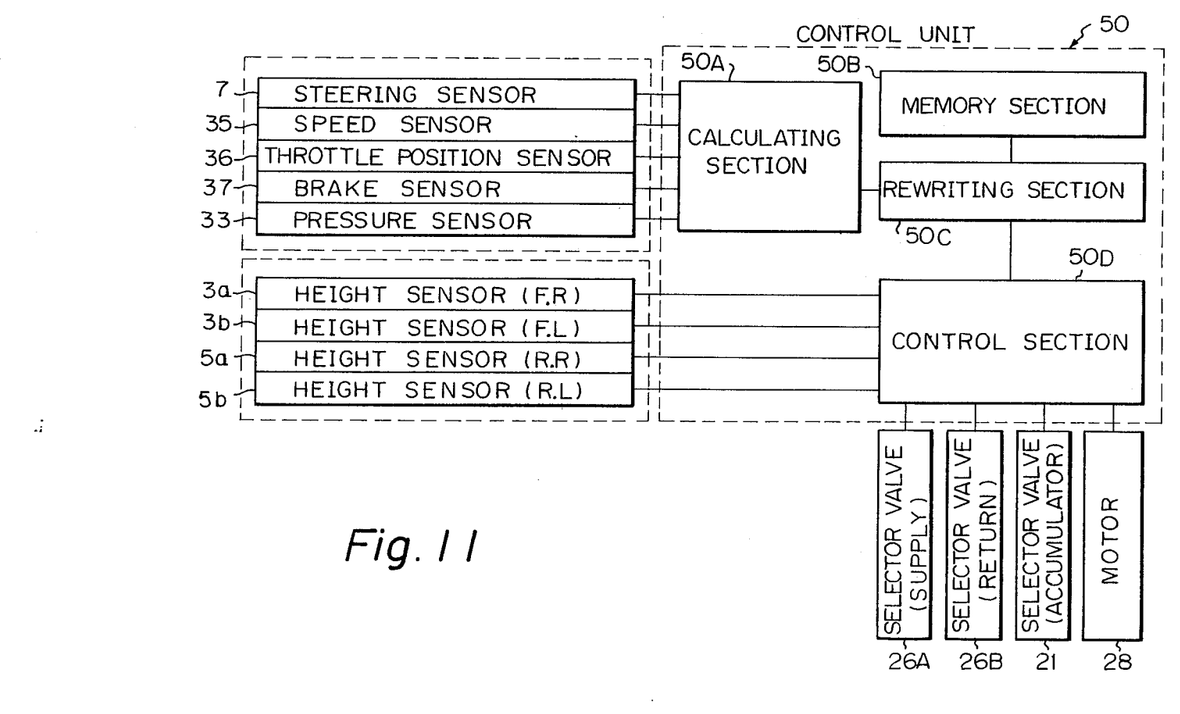
FIG. 11, which is similar to FIG. 4, is a block diagram of the control system of the suspension controller in accordance with the second embodiment.

FIG. 11 is a block diagram of the control system in accordance with this embodiment.

The control unit 50 in this embodiment is similar to the control unit 34 in the first embodiment. More specifically, the control unit 50 is supplied with inputs in the form of detection signals from the height sensors 3a, 3b, 5a, 5b, the steering sensor 7, the pressure sensor 33, the speed sensor 35, the brake sensor 37 and the throttle position sensor 36. Further, the supply-side selector valve 26A, the return-side selector valve 26B, the selector valve 21 for adjusting spring constant and damping force, and the motor 28 are connected to the control unit 50 for control.

The control unit 50 in this embodiment, which is similar to the control unit 34 in the first embodiment, is also defined by a microcomputer or the like which has a calculating section 50A, a memory section 50B, a rewriting section 50C and a control section 50D. In a manner similar to that in the case of the first embodiment, the memory section 50B stores various combinations of data obtained directly from various sensors or data obtained by calculating data from the sensors in the calculating section 50B, and sets of logics for the suspension units which respectively correspond to the combinations of data, together with a logic holding time which corresponds to each of the sets of logics. When a selected one of these sets of logics is held in the control section 50D by rewriting of the control logics, the selected set of logics are held in the control section 50D during a holding time which corresponds to this set of logics.

When the vehicle is in a normal state, the control section 50D stores control logics "N" for all the suspension logics 1a, 1b, 2a and 2b and is supplied with inputs in the form of logic signals indicating the heights of various portions of the vehicle body S from the respective height sensors 3a, 3b, 5a and 5b, thus effecting feedback control so that all the suspension units are maintained at an expansion/contraction position corresponding to the logic "N".

The calculating section 50D is supplied with inputs in the form of signals from the speed sensor 35, the brake sensor 37, the throttle position sensor 36 and the steering sensor 35 in order to carry out various kinds of calculations when the brake pedal, accelerator (neither of which are shown) or the steering wheel 6 is actuated. For example, when the accelerator is actuated, the calculating section 50A calculates the direction of movement of the throttle valve, the degree of opening thereof and the speed of movement of the throttle valve on the basis of the signal delivered from the throttle position sensor 36. The calculating section 50A estimates the amount of change in acceleration acting on the vehicle after, for example, 0.5 seconds, and makes a judgement as to whether or not the estimated amount of change exceeds a predetermined value, that is, as to whether or not the estimated amount of change falls in a range within which the above-described feedback control carried out when the vehicle is in a normal state can follow the change in acceleration. Similarly, when the brake pedal is actuated, the calculating section 50A calculates the direction of movement of the brake pedal (whether an incremental or decremental direction), the pressure of braking fluid and the amount of change in braking fluid pressure per unit of time on the basis of the signal delivered from the brake sensor 37, whereas, when the steering wheel 6 is turned, the calculating section 50A calculates the direction, angle and speed of rotation of the steering wheel 6 on the basis of the signal delivered from the steering sensor 7. The calculating section 50A then performs the same calculation and judgement as those conducted in the case where the accelerator is actuated.

In the memory section 50B, the above-described various combinations of data have been stored in advance. Then, a set of logics for the suspension units which is determined for each of the combinations of data and a logic holding time which corresponds to each set of logics are stored in the memory section 50B in accordance with the following procedure. For example, it is assumed that a set of data consists of the vehicle speed, the direction of movement of the throttle valve, the degree of opening of the valve and the speed of movement of the throttle valve. Under this set of conditions, the amount of change in acceleration that will act on the vehicle 0.5 seconds, for example, is calculated. Also calculated are the amount of change in the load acting on each of the suspension units or the amount of increase or decrease in load per unit of time due to the change in acceleration, and the duration period of the increase or decrease in load. Then, a logic is obtained for each suspension unit whereby the supply or discharge of oil to or from the suspension unit is continuously carried out during the duration period mentioned so that the increase or decrease in load is balanced and the supply or discharge of oil to or from the suspension unit is consequently controlled so that there is substantially no change in the expansion/contraction position of the suspension unit and the corresponding portion of the vehicle body S is maintained at a position corresponding to the logic "N". Sets of logics and corresponding periods of duration which are obtained as described above are stored in the form of a table in the memory section 50B in such a manner that these sets of logics and corresponding periods of duration respectively correspond to the aforementioned sets of data.

Figure 12:
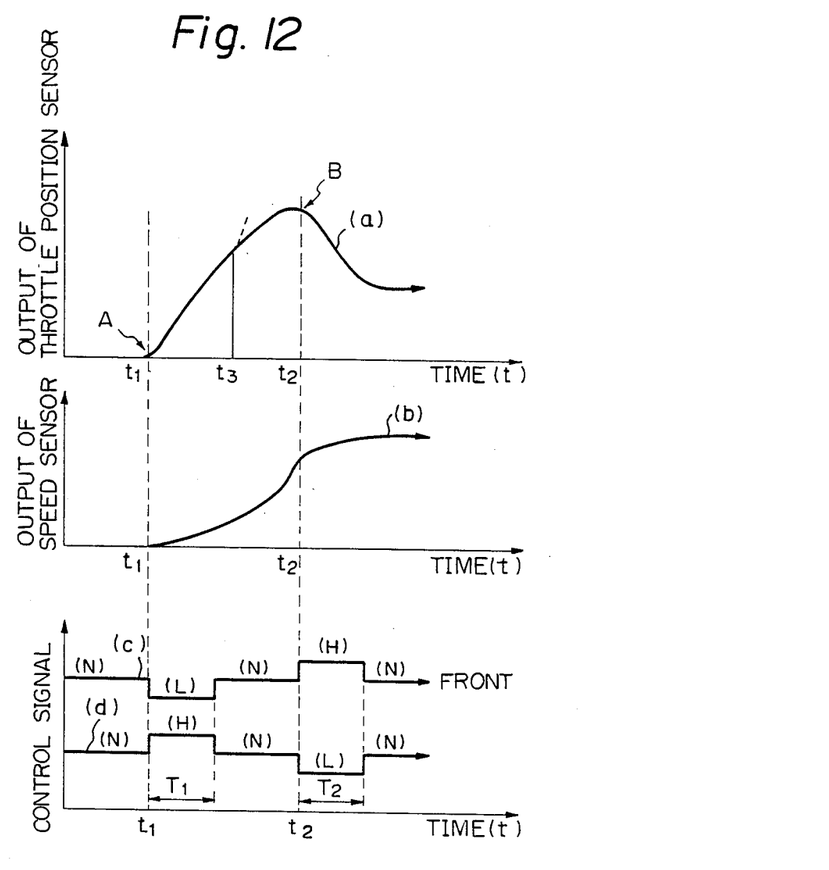
FIG. 12 is a graph showing the way in which the controller shown in FIG. 11 effects control when the vehicle begins to move forward.

A control operation for suppressing the generation of the squat phenomenon and any reactive jerk at the time of moving the vehicle formed from start will be explained below with reference to FIG. 12. The curve (a) in the graph shown in FIG. 12 represents one example of the change in output of the throttle position sensor 36 at the time of starting to move the vehicle, while the curve (b) represents the change in output of the speed sensor 35 which corresponds to the change in output of the throttle position sensor 36. At the time t1, since the vehicle is at rest, the signal from the speed sensor 35 indicates that the vehicle speed is zero. At this time, the accelerator is suddenly depressed, and the output of the throttle position sensor 36 shows a sudden change as shown by that portion of the curve (a) indicated by the arrow A in the graph. The calculating section 50A in the control unit 50 calculates the direction of movement of the throttle valve, the degree of opening of the valve and the speed of movement of the throttle valve on the basis of the signals delivered from the speed sensor 35 and the throttle positions sensor 36 at that time. The calculating section 50A further calculates the amount of change in acceleration after 0.5 seconds, and makes a judgement as to whether or not the calculated amount of change exceeds a predetermined value. For example, if the accelerator is depressed relatively slowly and it is judged that the amount of change in acceleration is smaller than a predetermined value, the above-described normal feedback control is carried out. However, if the amount of change in acceleration is judged to be greater than the predetermined value, the data items detected at that time, i.e., the vehicle speed, the direction of movement of the throttle valve, the degree of opening of the valve and the speed of movement of the throttle valve, are checked with the table stored in the memory section 50B by the rewriting section 50C in the control unit 50, and a corresponding set of logics, e.g., logics "L" for the suspension units 1a, 1b and logics "H" for the suspension units 2a, 2b, together with a corresponding period of duration T1, are selected from the table. Then, the control logics "N" for the suspension units which have been held in the control section 50D are rewritten and replaced with the newly selected logics. Since, in this state, the signals output from the height sensors 3a, 3b, 5a and 5b are different from the control logics held in the control section 50D, a control operation for each of the suspension units 1a, 1b, 2a and 2b is then started. More specifically, the control section 50D in the control unit 50 actuates the selector valves 26A and 26B in each of the suspension units 1a and 1b, so that the suspension body 10 is communicated with the return-side port 24b of the hydraulic unit 24 and further actuates the selector valves 26A and 26B in each of the suspension units 2a and 2b so that the suspension body 10 is communicated with the delivery-side port 24a of the hydraulic unit 24. Accordingly, the discharge of oil from the suspension units 1a and 1b for the front wheels is started at the same time as the load acting on these suspension units begins to decrease, while the supply of oil to the suspension units 2a and 2b is started at the same time as the load acting on these suspension units begins to increase, and the change in attitude of the vehicle is thus suppressed. The supply or discharge of oil to and from the suspension units continues in accordance with the increase or decrease in load for the predetermined period of duration T1, and when the duration T1 has elapsed, all the control logics held in the control section 50D are rewritten and replaced with "N". Since, at this point in time, the amount of change in acceleration acting on the vehicle has become small, the normal feedback control is resumed.

It should be noted that, even during the period of duration T1, signals from the speed sensor 35 and the throttle position sensor 36 are input to the control unit every 0.05 seconds, for example, and selection of logics corresponding to a change in acceleration expected to occur after 0.5 seconds is carried out in accordance with the above-described procedure every time the detection signals are inputted. If the newly selected logics are the same as the control logics held in the control section 50D, no rewriting of logics is performed, and the control which has been under way is continued. However, if the newly selected logics are different from the control logics presently held, the newly selected logics, e.g., the logic "LL" for each of the suspension units 1a and 1b, for the front wheels and the logic "HH" for each of the suspension units 2a and 2b for the rear wheels, are written in the control section 50D so as to replace the control logics "L" and "H" which have been held therein. Then, control is started in accordance with the new control logics and this control is continued for a new period of duration T'1. Thus, even after the control logics held in the control section 50D have been rewritten and control has been started in accordance with the new logics, necessary rewriting of the control logics is carried out in response to a subsequent change in the running conditions of the vehicle. Since this applies in each of the cases described below, explanation thereof will be omitted in the following description.

In the intermediate stage of the accelerating operation, the change in acceleration does not exceed the predetermined value and, therefore, normal feedback control is carried out during this period. In the final stage of the accelerating operation, when the accelerator is released at the time t2, the output of the throttle position sensor 36 decreases suddenly as shown by that portion of the curve (a) which is indicated by the arrow B in the graph. If a change in acceleration as a result of the operation of the accelerator is judged to be greater than the predetermined value, appropriate logics, e.g., "H" for each of the suspension units 1a and 1b, for the front wheels and "L" for each of the suspension units 2a and 2b for the rear wheels together with a period of duration T2, are selected, and the control logics held in the control section 50D in the control unit 50 are rewritten and replaced with the newly selected data. Since, in this case, the logic signals outputted from the height sensors are different from the control logics, the selector valves 26A and 26B in each of the suspension units 1a and 1b, for the front wheels are actuated so that the suspension units 1a and 1b, are communicated with the delivery-side port 24a of the hydraulic unit 24, and the selector valves 26A and 26B in each of the suspension units 2a and 2b for the rear wheels are actuated so that the suspension units 2a and 2b are communicated with the return-side port 24b of the hydraulic unit 24. Accordingly, the supply of oil to the suspension units 1a and 1b, for the front wheels is started at the same time as the load acting on these suspension units begins to increase, while the discharge of oil from the suspension units 2a and 2b for the rear wheels is started at the same time as the load acting on these suspension units begins to decrease, and the supply and discharge of oil are continued for a predetermined period of duration T2, thus enabling suppression of any reactive jerk. When the given duration has elapsed, all the control logics held in the control section 50D are rewritten and replaced with "N", and the normal feedback control is resumed. The curves (c) and (d) in the graph of FIG. 12 show the way in which the above-described control is effected. It should be noted that, if the release of the accelerator at the time t2 is performed slowly so that the change in acceleration is smaller than the predetermined value, no rewriting of the control logics is carried out and the normal feedback control is effected. If the output of the throttle position sensor 36 changes suddenly at the time t3 as shown by the chain line and the change in acceleration exceeds the predetermined value, a control operation which is similar to the one described one is carried out.

Figure 13:
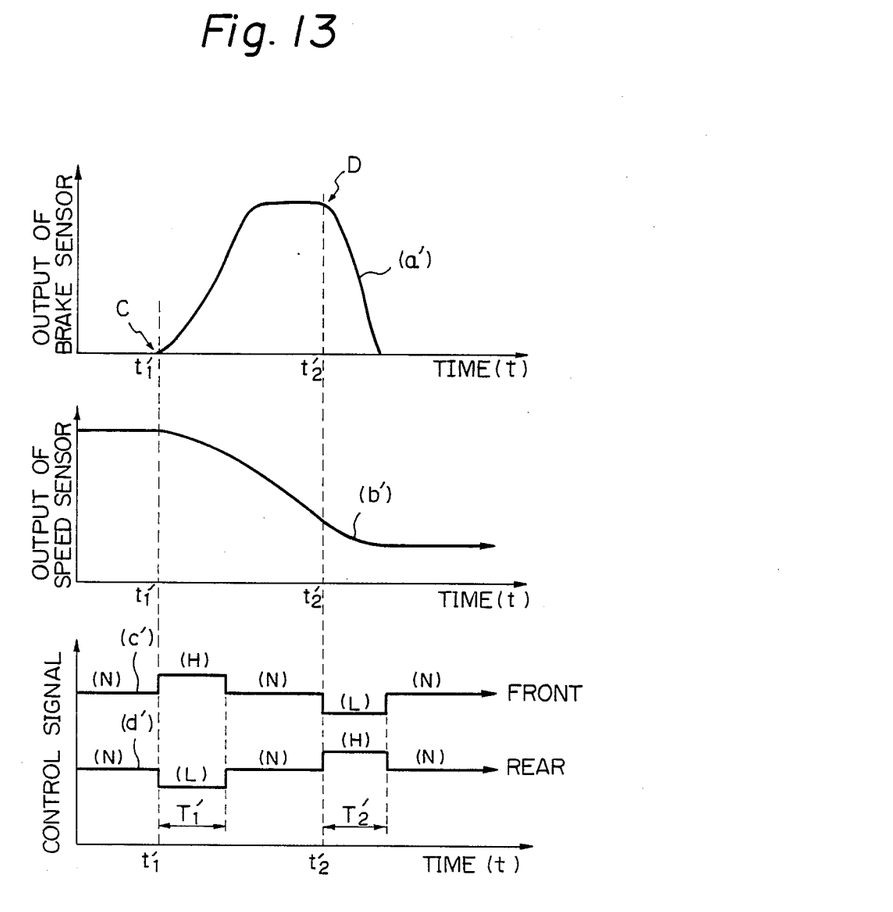
FIGS. 13 and 14, which are similar to FIG. 11, show the way in which the controller shown in FIG. 11 effects control when the vehicle is braked and when the steering wheel is actuated, respectively.

A control operation for suppressing the generation of the nose dive phenomenon and a reactive jerk in the case where braking force is applied to the vehicle will be described below with reference to FIG. 13. The curve (a') in the graph shown in FIG. 13 represents one example of the change in output of the brake sensor 37 in the case where braking force is applied to the vehicle, while the curve (b') represents the corresponding change in output of the speed sensor 35.

When the brake pedal (not shown) is suddenly depressed at the time t'1 and braking force is thereby applied to the vehicle which is moving at a certain speed, the output of the brake sensor 37 changes suddenly as shown by that portion of the curve (a') which is indicated by the arrow C. This output is, together with the output of the speed sensor 35, inputted to the calculating section 50A in the control unit 50. The calculating section 50A in the control unit 50 then calculates the direction of movement of the brake pedal at that time and the amount of change in the braking fluid pressure per unit of time and further makes a judgement as to whether or not the amount of change in acceleration which is expected to occur after 0.05 seconds exceeds a predetermined value. If the amount of change in acceleration exceeds the predetermined value, a set of logics which corresponds to the combination of data in this case, e.g., "H" as a logic for each of the suspension units 1a and 1b, for the front wheels and "L" as a logic for each of the suspension units 2a and 2b for the rear wheels together with a corresponding period of duration T'1, are selected from the memory section 50B in the control unit 50. The control logics N which have been held in the control section 50d in the control unit 50 are rewritten and replaced with the newly selected logics "H" and "L". Since, in this case, the control logics held in the control section 50D are different from the outputs of the height sensors 3a, 3b, 5a and 5b, control of each of the suspension units 1a, 1b, 2a and 2b is started. More specifically, the supply of oil to the suspension units 1a and 1b, for the front wheels is started at the same time as the load acting thereon begins to increase, while the discharge of oil from the suspension units 2a and 2b for the rear wheels is started at the same time as the load acting thereof begins to decrease, and the supply and discharge of oil are continued for a predetermined period of duration T'1, the nose dive phenomenon thus being suppressed. When the duration T'1 has elapsed, all the control logics are automatically rewritten and replaced with "N", and normal feedback control is thus resumed. When the brake pedal is released at the time t'2 and the output of the brake sensor 37 changes suddenly as shown by that portion of the curve (a') indicated by the arrow D, a logic "L" for each of the suspension units 1a and 1b, for the front wheels, a logic "H" for each of the suspension units 2a and 2b for the rear wheels, and a period of duration T'2 are selected in accordance with a procedure similar to the above, and a control operation similar to the above is effected to suppress the generation of any reactive jerk. The curves (c') and (d') in the graph of FIG. 13 show the way in which the above-described control is effected. It will be readily understood that, when the brake pedal is actuated slowly so that the amount of change in acceleration does not exceed the predetermined value, no rewriting of the control logics is performed and the normal feedback control is continued. The amount of change in acceleration exceeds the predetermined value at any time other than t'1 and t'2, the above-described control operation is carried out.

Figure 14:
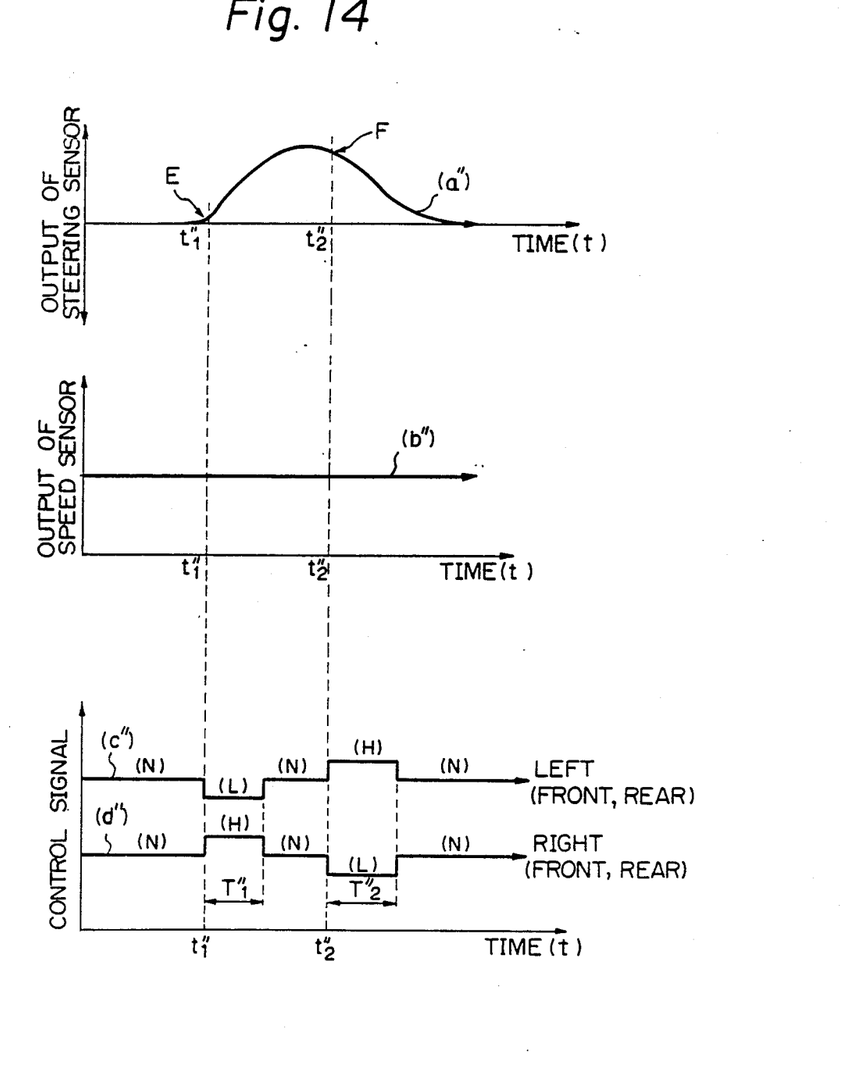

A control operation for suppressing rolling in the case where the steering wheel 6 is suddenly turned during running of the vehicle will be described below with reference to FIG. 14. Each of the curves (a'') and (b'') in the graph shown in FIG. 14 shows the change in output of the steering sensor 7 in the case where, while the vehicle is running at a certain speed, the rotation of the steering wheel 6 in one direction is suddenly started at the time t''1, and the rotation of the steering wheel 6 in the other direction is started at the time t''2. At the time t''1, the calculating section 50A in the control unit 50 calculates a direction, angle and angular velocity of rotation of the steering wheel 6 on the basis of the signal delivered from the steering sensor 7 and further calculates the amount of change in acceleration which is anticipated to occur after 0.5 seconds on the basis of the calculated data and the signal delivered from the speed sensor 35. When the calculated amount of change in acceleration is judged to be greater than a predetermined value, predetermined logics, e.g., a logic "H" for each of the suspension units 1a and 2a which are disposed on the right-hand side of the vehicle, together a logic "L" for each of the suspension units 1b and 2b which are disposed on the left-hand side of the vehicle, together with a period of duration T''1, are selected from the memory section 50B, and the control logics held in the control section 50D are rewritten and replaced with the selected logics. Then, the control of each suspension unit is started. After the control has been continuously effected during the duration T''1, the control logics are rewritten and replaced with "N", and the normal feedback control is resumed. At the time t''2, a logic "L" for each of the right-hand side suspension units 1a and 2a and a logic "H" for each of the left-hand side suspension units 1b and 2b together with a period of duration T''2, are selected, and control is effected on the basis of the selected data. The curves (c'') and (d'') show the way in which the above-described control is effected.

Although the suspension control has been described above separately for three different cases, that is, the case where acceleration is suddenly applied to the vehicle, the case where braking force is suddenly applied to the vehicle, and the case where the steering wheel is suddenly turned, it will readily be understood that it is of course possible to effect control even in the case where these operations are conducted in a mixed manner, for example, in the case where the driver quickly turns the steering wheel while suddenly depressing the brake pedal. In this case, the calculating section in the control unit performs various kinds of calculation based on the signals input from the speed sensor, the brake sensor and the steering sensor. In addition, the memory section is arranged to store various combinations of data concerning the vehicle speed, the direction of movement of the brake pedal, the level of pressure of braking fluid, the rate of change of braking fluid pressure and the direction, angle and angular velocity of rotation of the steering wheel, and logics for each of the suspension units which correspond to these data items. Unlike the above-described three cases, this case involves the possibility that all the logics for the four suspension units are different from each other.

As will be clear from the above description, the suspension controller for a vehicle according to the present invention is arranged such that any change in attitude of the vehicle which will occur in the future is estimated from the present running conditions of the vehicle, and control of each of the suspension units is started immediately thereafter so as to suppress the change in attitude or change the attitude of the vehicle as desired. Accordingly, it is possible to effectively control the attitude of the vehicle during cornering or at the time of rapidly moving the vehicle formed from start, or when the brakes are suddenly applied. Thus, the driving performance is improved by a large margin, and the occupant of the vehicle can be assured of enjoying a comfortable ride.

Although the present invention has been described through specific terms, it should be noted here that the described embodiments are not necessarily exclusive and various changes and modifications may be imparted thereto without departing from the scope of the invention which is limited solely by the appended claims

What is claimed is:

1. A suspension system for a vehicle including a plurality of suspension units which bear the load of the vehicle and which can be contracted and extended in order to adjust the attitude of the vehicle, said system comprising:
   a first detecting means for detecting and outputting at least one driving parameter of actual driving conditions of the vehicle which influence the attitude of the vehicle;
   a second detecting means for detecting and outputting positions of said suspension units;
   a calculating means for determining, based on said at least one driving parameter of actual driving conditions output from said first detecting means, a predicted attitude of the vehicle at a predetermined time period following a time during which said at least one driving parameter of actual driving conditions was detected, and for outputting a predicted attitude data set in accordance with said predicted attitude;

a data memory means for storing a plurality of predicted attitude data sets and a plurality of control data sets respectively corresponding to each of said plurality of predicted attitude data sets and having information for the control of the positions of the suspension units;

a storing and control means for storing and utilizing one control data set to control the suspension units in such a manner that the positions of the suspension units detected by said second detecting means are brought into conformity with the positions indicated by said one control data set;

rewriting means for selecting a control data set from said data memory means based on said predicted attitude data set outputted by said calculating means and for replacing a previously selected control data set previously stored in said storing and control means with the selected control data set selected by said rewriting means;

wherein the control of said suspension units is effected by said control means after rewriting of said selected control data set has been completed.

2. A suspension controller for a vehicle according to claim 1, wherein said first detecting means includes a speed sensor for detecting vehicle speed and a steering sensor for detecting an amount of rotation of the steering wheel, and wherein the control data set stored in said storing and control means includes expansion/contraction positions of said suspension units which are such that the floor surface of said vehicle is kept substantially perpendicular to a direction in which composite acceleration acts on the vehicle during cornering, said composite acceleration being a composite of a centrifugal force acting on said vehicle and a gravitational force acting on said vehicle.

3. A suspension controller for a vehicle according to claim 2, wherein said calculating means receives signals outputted from said speed sensor and said steering sensor for calculating vehicle speed and direction, angle and speed of rotation of the steering wheel, and wherein the expansion/contraction positions of said suspension units stored in said data memory means as said control data set are determined on the basis of a magnitude of acceleration which is anticipated to act on the vehicle after a predetermined period of time.

4. A suspension controller for a vehicle according to claim 1, wherein said data memory means stores a predetermined holding time for each of said control data sets, so that said storing and control means maintains said suspension units at a position corresponding to said one control data set stored therein during a holding time corresponding to said one control data set.

5. A suspension controller for a vehicle according to claim 4, wherein said first detecting means has a speed sensor for detecting a vehicle speed and a sensor for detecting at least one of steering wheel rotation, brake activation and accelerator actuation; wherein said calculating means calculates an amount of change in acceleration which is anticipated to act on the vehicle after a predetermined period of time based on outputs from said sensors; and wherein said rewriting means replaces the control data set previously stored in said storing and control means with said selected control data set when said amount of change calculated by said calculation means exceeds a predetermined value.

6. A suspension controller for a vehicle according to claim 1, wherein said second detecting means is a height sensor.

7. A suspension controller for a vehicle according to claim 1, wherein each of said detected positions output from said second detecting means is in the form of a logic signal.

* * * * *